United States Patent
Bleys et al.

(10) Patent No.: US 7,169,824 B2
(45) Date of Patent: *Jan. 30, 2007

(54) PROCESS FOR PREPARING A FLEXIBLE POLYURETHANE FOAM

(75) Inventors: Gerhard Jozef Bleys, Heverlee (BE); Eric Huygens, Heverlee (BE); Jan-Willem Leenslag, Tremelo (BE); Herman Eugene Germain Moureau, Tienen (BE)

(73) Assignee: Huntsman International LLC, The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/202,580

(22) Filed: Jul. 24, 2002

(65) Prior Publication Data

US 2003/0087979 A1 May 8, 2003

Related U.S. Application Data

(63) Continuation of application No. PCT/EP01/00553, filed on Jan. 18, 2001.

(30) Foreign Application Priority Data

Feb. 14, 2000 (EP) .................................. 00102963
Jul. 20, 2000 (EP) .................................. 00115637

(51) Int. Cl.
*C08G 18/28* (2006.01)

(52) U.S. Cl. ...................... 521/174; 521/130; 521/137; 521/170; 521/176

(58) Field of Classification Search ................ 521/130, 521/137, 170, 174, 176
See application file for complete search history.

(56) References Cited

U.S. PATENT DOCUMENTS

| | | |
|---|---|---|
| 4,143,004 A | 3/1979 | Stromblad et al. |
| 5,162,382 A | 11/1992 | Carswell et al. |
| 5,270,348 A | 12/1993 | Muller et al. |
| 5,296,518 A | 3/1994 | Grasel et al. |
| 5,334,689 A | 8/1994 | Muller et al. |
| 5,420,170 A | 5/1995 | Lutter et al. |
| 5,441,993 A | 8/1995 | Maretti |
| 5,459,170 A | 10/1995 | Bleys et al. |
| 5,521,226 A | 5/1996 | Bleys |
| 5,565,498 A | 10/1996 | Chaffanjon et al. |
| 5,576,409 A * | 11/1996 | Mackey ....................... 528/49 |
| 5,594,097 A | 1/1997 | Chaffanjon et al. |
| 5,621,016 A | 4/1997 | Murty et al. |
| 5,668,191 A | 9/1997 | Kinkelaar et al. |
| 5,677,361 A | 10/1997 | Treboux et al. |
| 5,700,847 A | 12/1997 | Thompson |
| 5,773,483 A | 6/1998 | Eling et al. |
| 5,919,395 A * | 7/1999 | Bastin et al. .......... 252/182.24 |
| 6,068,790 A * | 5/2000 | Postema et al. ....... 252/182.27 |
| 6,245,825 B1 | 6/2001 | Bleys |
| 6,376,698 B1 | 4/2002 | Bleys |
| 6,521,674 B1 * | 2/2003 | Haley et al. ................. 521/137 |
| 6,579,912 B2 * | 6/2003 | Parfondry et al. .......... 521/174 |
| 6,806,342 B2 * | 10/2004 | Bleys et al. .................. 528/77 |
| 6,884,824 B2 * | 4/2005 | Bleys et al. ................. 521/159 |

FOREIGN PATENT DOCUMENTS

| | | |
|---|---|---|
| CA | 2088414 | 8/1993 |
| DE | 43 18 120 | 12/1994 |
| EP | 0 547 765 | 6/1993 |
| EP | 1 028 133 | 8/2000 |
| GB | 1 585 901 | 3/1981 |
| WO | WO 00/55232 | 9/2000 |
| WO | WO 01/32735 | 5/2001 |
| WO | WO 01/32736 | 5/2001 |
| WO | WO 02/06369 | 1/2002 |

* cited by examiner

*Primary Examiner*—John M. Cooney, Jr.
(74) *Attorney, Agent, or Firm*—Ron D. Brown; Nicole Graham

(57) ABSTRACT

Process for preparing flexible polyurethane foam by reacting an MDI-based polyisocyanate and a polyether polyol with a high oxyethylene content in a mold.

19 Claims, No Drawings

1

PROCESS FOR PREPARING A FLEXIBLE POLYURETHANE FOAM

CROSS REFERENCE TO RELATED APPLICATIONS

This application is a continuation of international application PCT EP01/00553, filed Jan. 18, 2001.

FIELD OF THE INVENTION

The present invention is related to a process for preparing flexible polyurethane foam and to such foams having specific properties. More specifically, the present invention is related to a process for preparing flexible polyurethane foam in a mould using a polyoxyethylene polyoxypropylene polyol having a high oxyethylene content and a polyisocyanate having a high 4,4'-diphenylmethane diisocyanate content (MDI).

BACKGROUND OF THE INVENTION

Processes for preparing flexible foams from polyols having a high oxyethylene (EO) content and a polyisocyanate having a high 4,4'-MDI content, have been disclosed in EP 547765. The examples shown in EP 547765 give low density foams with a low resilience, and no mouldings have been made.

Copending application EP 99105419.8 discloses a process for making a moulded polyurethane material, like a flexible polyurethane foam, by reacting 4,4'-diphenylmethane diisocyanate, a polyol having a high oxyethylene content and water. Repetitive mouldings can be made without the need to treat the mould for easy demoulding after every part has been made.

Surprisingly, it has now been found that if a polyol is used that has a high oxyethylene content and a high level of primary hydroxyl groups such easy demoulding is obtained as well, together with other good properties: load-bearing capacity, tear strength, creep properties, compression set and elongation and the foam has an improved resilience, especially at low density.

SUMMARY OF THE INVENTION

Therefore, the present invention is concerned with a process for preparing a flexible polyurethane foam having an apparent overall density of 15–150 kg/m³ comprising reacting in a mould a polyisocyanate and an isocyanate-reactive composition in the presence of water, wherein the reaction is conducted at an isocyanate index of 40 to 120, the polyisocyanate consists of a) 80–100% by weight of diphenylmethane diisocyanate comprising at least 40%, preferably at least 60% and most preferably at least 85% by weight of 4,4'-diphenylmethane diisocyanate and/or a variant of said diphenylmethane diisocyanate which variant is liquid at 25° C. and has an NCO value of at least 5% by weight (polyisocyanate a), and b) 20–0% by weight of another polyisocyanate (polyisocyanate b), and wherein the isocyanate-reactive composition consists of a) 70–100 and preferably 80–100% by weight of a polyether polyol having an average nominal functionality of 2–8, an average equivalent weight of 750–5000, an average molecular weight of 2000–12000, an oxyethylene (EO) content of 60–90% by weight and a primary hydroxyl content of 70–100% calculated on the number of primary and secondary hydroxyl groups in the polyol, and b) 30–0 and preferably 20–0% by weight of one or more other isocyanate-reactive compounds not being water.

Further, the present invention is concerned with a moulded flexible polyurethane foam having an apparent overall density of 15–150 kg/m³ (ISO 845), preferably of 15–54 and most preferably of 25–50 kg/m³ and preferably having a load bearing capacity (CLD at 40% compression, ISO 3386/1) of 1–15 and most preferably of 4–12 kPa, and an oxyethylene content of 30–65% by weight based on the weight of the foam and preferably of 35–60% by weight and comprising oxyethylene and oxypropylene groups in a ratio of 1.5:1–9:1 w/w and a resilience (ISO 8307) of 40–80% and preferably of 50–80% and most preferably of 55–80%.

These foams can be easily demoulded, even without the use of internal mould release agents and without the repetitive use of external mould release agents, as described in copending application EP 99105419.8. Still further, these foams show good values for resilience, tear strength, creep, elongation and compression set, especially at lower density.

DETAILED DESCRIPTION OF THE INVENTION

In the context of the present invention the following terms have the following meaning:
1) isocyanate index or NCO index or index: the ratio of NCO-groups over isocyanate-reactive hydrogen atoms present in a formulation, given as a percentage:

$$\frac{[NCO] \times 100}{[\text{active hydrogen}]}(\%).$$

In other words the NCO-index expresses the percentage of isocyanate actually used in a formulation with respect to the amount of isocyanate theoretically required for reacting with the amount of isocyanate-reactive hydrogen used in a formulation.

It should be observed that the isocyanate index as used herein is considered from the point of view of the actual foaming process involving the isocyanate ingredients and the isocyanate-reactive ingredients. Any isocyanate groups consumed in a preliminary step to produce modified polyisocyanates (including such isocyanate-derivatives referred to in the art as prepolymers) or any active hydrogens consumed in a preliminary step (e.g. reacted with isocyanate to produce modified polyols or polyamines) are not taken into account in the calculation of the isocyanate index. Only the free isocyanate groups and the free isocyanate-reactive hydrogens (including those of the water) present at the actual foaming stage are taken into account.

2) The expression "isocyanate-reactive hydrogen atoms" as used herein for the purpose of calculating the isocyanate index refers to the total of active hydrogen atoms in hydroxyl and amine groups present in the reactive compositions; this means that for the purpose of calculating the isocyanate index at the actual foaming process one hydroxyl group is considered to comprise one reactive hydrogen, one primary amine group is considered to comprise one reactive hydrogen and one water molecule is considered to comprise two active hydrogens.

3) Reaction system: a combination of components wherein the polyisocyanates are kept in one or more containers separate from the isocyanate-reactive components.

4) The expression "polyurethane foam" as used herein refers to cellular products as obtained by reacting polyisocyanates with isocyanate-reactive hydrogen containing compounds, using foaming agents, and in particular includes cellular products obtained with water as reactive foaming agent (involving a reaction of water with isocyanate groups yielding urea linkages and carbon dioxide and producing polyurea-urethane foams) and with polyols, aminoalcohols and/or polyamines as isocyanate-reactive compounds.

5) The term "average nominal hydroxyl functionality" is used herein to indicate the number average functionality (number of hydroxyl groups per molecule) of the polyol or polyol composition on the assumption that this is the number average functionality (number of active hydrogen atoms per molecule) of the initiator(s) used in their preparation although in practice it will often be somewhat less because of some terminal unsaturation.

6) The word "average" refers to number average unless indicated otherwise.

The present invention is concerned with a process for preparing a flexible polyurethane foam having an apparent overall density of 15–150 kg/m³ comprising reacting in a mould a polyisocyanate and an isocyanate-reactive composition in the presence of water, wherein the reaction is conducted at an isocyanate index of 40 to 120, the polyisocyanate consists of a) 80–100% by weight of diphenylmethane diisocyanate comprising at least 40%, preferably at least 60% and most preferably at least 85% by weight of 4,4'-diphenylmethane diisocyanate and/or a variant of said diphenylmethane diisocyanate which variant is liquid at 25° C. and has an NCO value of at least 5% by weight (polyisocyanate a), and b) 20–0% by weight of another polyisocyanate (polyisocyanate b), and wherein the isocyanate-reactive composition consists of a) 70–100 and preferably 80–100% by weight of a polyether polyol having an average nominal functionality of 2–8, an average equivalent weight of 750–5000, an average molecular weight of 2000–12000, an oxyethylene (EO) content of 60–90% by weight and a primary hydroxyl content of 70–100% calculated on the number of primary and secondary hydroxyl groups in the polyol, and b) 30–0 and preferably 20–0% by weight of one or more other isocyanate-reactive compounds not being water.

Further, the present invention is concerned with a moulded flexible polyurethane foam having an apparent overall density of 15–150 kg/m³ (ISO 845), preferably of 15–54 and most preferably of 25–50 kg/m³ and preferably having a load bearing capacity (CLD at 40% compression, ISO 3386/1) of 1–15 and most preferably of 4–12 kPa, and an oxyethylene content of 30–65% by weight based on the weight of the foam and preferably of 35–60% by weight and comprising oxyethylene and oxypropylene groups in a ratio of 1.5:1–9:1 w/w and a resilience (ISO 8307) of 40–80% and preferably of 50–80% and most preferably of 55–80%.

These foams can be easily demoulded, even without the use of internal mould release agents and without the repetitive use of external mould release agents, as described in copending application EP 99105419.8.

Still further these foams show good values for resilience, tear strength, creep, elongation and compression set, especially at lower density. In the following table, general and preferred ranges of these properties are shown for the foams according to the present invention, together with the way they are measured.

|  | general range | preferred range | method of measurement |
|---|---|---|---|
| Tear strength, N/m | 150–600 | 250–550 | ISO/DIS8067 |
| Creep, % | 2–5 | 2.2–4.5 | see below* |
| Elongation, % | 100–200 | 120–200 | ISO 1798 |
| Compression set (dry, 50%), % | 1–15 | 1–10 | ISO 1856 |
| (humid, 50%), % | 0–10 | 0–8 | |

*Creep is measured by the method disclosed in Utech '94 proceedings, Paper 5 of A. Cunningham et al, pages 1–6.

Preferably, the polyisocyanate a) is selected from 1) a polyisocyanate comprising at least 40%, preferably at least 60% and most preferably at least 85% by weight of 4,4'-diphenylmethane diisocyanate, 2) a carbodiimide and/or uretonimine modified variant of polyisocyanate 1), the variant having an NCO value of 20% by weight or more, 3) a urethane modified variant of polyisocyanate 1), the variant having an NCO value of 20% by weight or more and being the reaction product of an excess of polyisocyanate 1) and of a polyol having an average nominal hydroxyl functionality of 2–4 and an average molecular weight of at most 1000, 4) a prepolymer having an NCO value of 10% by weight or more and preferably of 20% by weight or more and which is the reaction product of an excess of any of the aforementioned polyisocyanates 1–3) or mixtures thereof and of a polyether polyol having an average nominal functionality of 2–8, an average molecular weight of 2000–12000 and preferably an hydroxyl value of 15 to 60 mg KOH/g, and 5) mixtures of any of the aforementioned polyisocyanates.

Polyisocyanate 1) comprises at least 40% by weight of 4,4'-MDI. Such polyisocyanates are known in the art and include pure 4,4'-MDI, isomeric mixtures of 4,4'-MDI and up to 60% by weight of 2,4'-MDI and 2,2'-MDI. It is to be noted that the amount of 2,2'- MDI in the isomeric mixtures is rather at an impurity level and in general will not exceed 2% by weight, the remainder of up to 60% by weight being 2,4'-MDI. Polyisocyanates as these are known in the art and commercially available. For example, SUPRASEC™ MPR isocyanate(commercially available from Huntsman Specialty Chemicals, which is a business of Huntsman International LLC).

The carbodiimide and/or uretonimine modified variants of the above polyisocyanate 1) are also known in the art and commercially available (e.g. SUPRASEC 2020 isocyanate, which is commercially available from Huntsman Specialty Chemicals Division). Urethane modified variants of the above polyisocyanate 1) are also known in the art; an example is DESMODUR™ PF polyisocyanate of Bayer.

Aforementioned prepolymers having an NCO value of 10% by weight or more and preferably of 20% by weight or more are also known in the art. Preferably, the polyol used for making these prepolymers is selected from polyoxyethylene polyoxypropylene polyols having an average nominal functionality of 2–8, an average molecular weight of 2000–12000, and preferably an hydroxyl value of 15–60 mg KOH/g and either an oxyethylene content of 5–40% by weight, which oxyethylene preferably is at least partially at the end of the polymer chains, or an oxyethylene content of 50–90% by weight, which oxyethylene preferably is randomly distributed over the polymer chains; most preferably such polyols are used which have an oxyethylene content of 60–90% by weight. If such prepolymers from polyols having a molecular weight from 2000–12000 are used, the amount of these polyols in the prepolymers compared to the total amount of these polyols having an average molecular weight of 2000–12000 used in making the foam is preferably less than 50% and more preferably less than 30% by weight. The other polyisocyanate b) may be chosen from aliphatic, cycloaliphatic, araliphatic and, preferably, aromatic polyisocyanates, such as toluene diisocyanate in the form of its 2,4 and 2,6-isomers and mixtures thereof and mixtures of diphenylmethane diisocyanates (MDI) and oligomers thereof having an isocyanate functionality greater than 2 known in the art as "crude" or polymeric MDI (polymethylene polyphenylene polyisocyanates). Mixtures of toluene diisocyanate and polymethylene polyphenylene polyisocyanates may be used as well.

Polyol a) having a high EO content and a high primary hydroxyl content are selected from those having an EO content of 60–90% by weight and preferably of 65–85% by weight calculated on the weight of the polyether polyol and a primary hydroxyl content of 70–100% and preferably of 80–100% calculated on the number of primary and secondary hydroxyl groups in the polyol. These polyether polyols contain other oxyalkylene groups like oxypropylene and/or oxybutylene groups; preferably these polyether polyols are polyoxyethylene polyoxypropylene polyols. These polyols have an average nominal functionality of 2–8 and preferably of 2–6, an average equivalent weight of 750–5000 and preferably of 1000–4000 and a molecular weight of 2000–12000 and preferably of 2000–10000. As long as there are sufficient oxyethylene groups at the end of the polymer chains so as to meet the requirement of the primary hydroxyl content the distribution of the oxyethylene and other oxyalkylene groups over the polymer chains may be of the type of a random distribution, a block copolymer distribution or a combination thereof. Mixtures of polyols may be used. Methods to prepare such polyols are known and such polyols are commercially available. Examples are CARADOL™ 3602 polyol from Shell and LUPRANOL™ 9205 polyol from BASF.

The other isocyanate-reactive compounds, which may be used in an amount of 0–30% by weight, preferably 0–20% by weight and more preferably 0–10% by weight, may be selected from polyether polyamines, polyester polyols and polyether polyols (different from the above described ones) having a molecular weight of 2000 or more and in particular from such other polyether polyols, which may be selected from polyoxyethylene polyols, polyoxypropylene polyols, polyoxyethylene polyoxypropylene polyols having an oxyethylene content of less than 60% or more than 90% by weight and polyoxyethylene polyoxypropylene polyols having a primary hydroxyl content of less than 70%. Preferred polyoxyethylene polyoxypropylene polyols are those having an oxyethylene content of 5–40% wherein all or part of the oxyethylene groups are at the end of the polymer chains (so-called EO-tipped or EO-capped polyols) and those having an oxyethylene content of 60–90% by weight and having all oxyethylene groups and oxypropylene groups randomly distributed and a primary hydroxyl content of 20–60%, calculated on the number of primary and secondary hydroxyl groups in the polyol. Preferably, these other polyether polyols have an average nominal functionality of 2–8, more preferably 2–6 and an average molecular weight of 2000–12000, more preferably of 2000–10000. Further, the other isocyanate-reactive compounds may be selected from chain extenders and cross-linkers, which are isocyanate-reactive compounds having an average molecular weight below 2000, preferably up to 1000 and a functionality of 2–8. Examples of such chain-extenders and cross-linkers are ethylene glycol, butanediol, diethylene glycol, propylene glycol, dipropylene glycol, glycerol, trimethylolpropane, pentaerythritol, sucrose, sorbitol, mono-, di- and triethanolamine, ethylenediamine, toluenediamine, diethyltoluenediamine, polyoxyethylene polyols having an average nominal functionality of 2–8 and an average molecular weight of less than 2000 like ethoxylated ethylene glycol, -butane diol, -diethylene glycol, -propylene glycol, -dipropylene glycol, -glycerol, -trimethylol propane, -pentaerythritol, -sucrose and -sorbitol having said molecular weight, and polyether diamines and triamines having an average molecular weight below 2000.

Mixtures of the aforementioned other isocyanate-reactive compounds may be used as well. Most preferred other isocyanate-reactive compounds are selected from the aforementioned polyols having an oxyethylene content of 5–30% by weight, polyoxyethylene polyols, chain-extenders, cross-linkers and mixtures thereof The polyols may comprise dispersions or solutions of addition or condensation polymers in polyols of the types described above. Such modified polyols, often referred to as "polymer polyols" have been fully described in the prior art and include products obtained by the in situ polymerisation of one or more vinyl monomers, for example styrene and/or acrylonitrile, in the above polyether polyols, or by the in situ reaction between a polyisocyanate and an amino- and/or hydroxy-functional compound, such as triethanolamine, in the above polyol. Polyoxyalkylene polyols containing from 1 to 50% by weight of dispersed polymer are particularly useful. Particle sizes of the dispersed polymer of less than 50 microns are preferred.

During the last years, several methods have been described to prepare polyether polyols having a low level of unsaturation. These developments have made it possible to use polyether polyols at the higher end of the molecular weight range since such polyols can now be prepared with an acceptably low level of unsaturation. According to the present invention, polyols having a low level of unsaturation may be used as well. In particular such high molecular weight polyols having a low level of unsaturation may be used. Most preferably, the amount of polyols having an average nominal functionality of 2–8, an average equivalent weight of 750–5000, an average molecular weight of 2000–12000 and an oxyethylene content of 60–90% by weight calculated on the total amount of isocyanate-reactive compounds used in making the foam (including those used in making the variants) is more than 90% by weight.

Still further, the following optional ingredients may be used: catalysts enhancing the formation of urethane bonds like tin catalysts like tin octoate and dibutyltindilaurate, tertiary amine catalysts like triethylenediamine and imidazoles like dimethylimidazole and other catalysts like maleate esters and acetate esters; surfactants; fire retardants; smoke suppressants; UV-stabilizers; colorants; microbial inhibitors; fillers; internal mould release agents (such agents may be used to further enhance the release of the materials made but are not essential) and external mould release agents (such agents preferably are only used at the beginning of the first moulding as explained later).

One of the special features of the present invention is that preferably the foams are made by reacting the ingredients in the absence of tin catalysts. Despite the fact that no tin catalyst is used, still flexible foams are obtainable with a low density, a high resilience and other good properties.

A particularly preferred class of catalysts is an alkali metal or alkaline earth metal carboxylate salt. The catalyst may be a salt of any metal of Groups IA and IIA of the Periodic Table but in general the alkali metal salts are preferred like potassium and sodium salts, especially the potassium salts. If desired mixtures of such salts may be used like a mixture of a potassium and a sodium salt. A catalytically effective amount of the salt will usually be in the range of 0.1 to 5, preferably 0.2–3 parts by weight per 100 parts by weight of reactants.

Although other polyurethane catalysts may be used together with these alkali metal or alkaline earth metal carboxylate salts, like the generally known tertiary amine catalysts and tin catalysts, it is preferred that the flexible foams are made in the absence of tin catalysts and more in particular in the absence of tin catalysts and tertiary amine catalysts.

The carboxylate may be selected from aliphatic carboxylates having 2–10 carbon atoms like acetate, hexanoate, 2-ethylhexanoate and octanoate. Especially, the carboxylate may be selected from those having the formula:

R—E—A—COO—, wherein

A is a hydrocarbon diradical having 1–6 preferably 1–3 carbon atoms;

E is —O— or

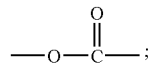

and

R is X—R$_1$—(OR$_2$)$_n$— wherein X is CH$_3$— or OH—, R1 is a hydrocarbon diradical having 1–8 and preferably 1–4 carbon atoms, R2 is a hydrocarbon diradical having 2–4 and preferably 2 or 3 carbon atoms and n is 0 to 10, preferably 0–5.

A may be selected from diradicals like —CH$_2$—, —CH$_2$CH$_2$—, —CH$_2$CH$_2$CH$_2$—, —CH=CH—CH$_2$—, —CH$_2$—CH—CH$_3$, —CH=CH—, —CH=C—CH$_3$ and CH$_2$=C—CH$_2$—. The most preferred diradical is —CH=CH— or —CH$_2$—C=CH$_2$.

R$_1$ may be selected from those diradicals mentioned for A and from radicals obtained by removing two hydrogen atoms from e.g. butane, pentane, hexane and octane. The most preferred radicals for R$_1$ are methylene, ethylene, trimethylene, tetramethylene and propylene.

R$_2$ may be selected from ethylene, trimethylene, tetramethylene, ethylethylene and propylene. Most preferred groups are ethylene and propylene.

Such catalysts and their preparation are known (i.e. EP 294161, EP 220697 and EP 751114). Examples of catalysts are sodium acetate, potassium acetate, potassium hexanoate, potassium 2-ethylhexanoate, potassium ethoxyacetate, sodium ethoxyacetate, the potassium salt of the hemi-ester of maleic acid and ethoxyethane, ethoxyethoxyethane, ethylene glycol, diethylene glycol, triethylene glycol, tetraethylene glycol, propylene glycol, dipropylene glycol, tripropylene glycol, methanol, ethanol, propanol or butanol and the potassium salt of the hemi-ester of such hydroxy containing compounds with malonic, succinic, glutaric, adipic or fumaric acid. Mixtures of these catalysts may be used as well.

Water is used as blowing agent optionally together with other blowing agents known in the art like hydrocarbons, so called CFC's and HCFC's, N$_2$ and CO$_2$. Most preferably water is used as the blowing agent, optionally together with CO$_2$. The amount of blowing agent will depend on the desired density. The amount of water will be between 0.8–5% by weight; calculated on the amount of all other ingredients used.

The reaction to prepare the foams are conducted at an NCO index of 40–120 and preferably of 70–110. The flexible foams may have apparent overall densities varying from 15 to 150 kg/m$^3$ and preferably from 15 to 54 and most preferably from 25 to 50 kg/m$^3$ (ISO 845).

The moulding process may be conducted with restricted and unrestricted foam rise. Unrestricted foam rise is feeding the ingredients, used to make the foam, in an open container and allowing the foam to form and rise without a closed upper lid or without a weight onto the rising foam. Restricted foam rise is allowing the foam to rise in a container with a weight onto the rising foam or allowing the foam to rise in a closed mould. Preferably the reaction is conducted with restricted foam rise and more preferably in a closed mould.

The process may be conducted in any type of mould known in the art. Examples of such moulds are the moulds commercially used for making polyurethane furniture parts, automotive seating and other automotive parts, like armrests and head-rests. The moulding process is a so-called cold-cure moulding process wherein the ingredients used for making the foam are fed into the mould at a temperature of from ambient temperature up to 80° C. and preferably up to 70° C., the mould being kept at a temperature of from ambient temperature up to 80° C. and preferably up to 70° C. during the process. After demoulding the foams are optionally cured for a period of 1 hour to 2 days at a temperature of ambient to 100° C. and preferably of ambient temperature to 70° C.

The isocyanate-reactive ingredients may be pre-mixed, optionally together with the optional ingredients, before being brought into contact with the polyisocyanate. Alternatively they may be brought into contact with the polyisocyanate via separate feeds.

The process according to the present invention may be applied using the so-called pour-in-place (PIP) and foam-in-fabric (FIF) technique. It has been observed that when the FIF technique is used no barrier or film is needed in order to prevent penetration. Conventional polyurethane systems which use primarily polyether polyols comprising predominantly oxypropylene groups normally need a barrier certainly at higher overpack; surprisingly the present systems can do without barriers.

Because the foams according to the present invention can be easily demoulded without applying external mould release after the first part has been made, the present invention is further concerned with a process for preparing a flexible polyurethane foam having an apparent overall density of 15–150 kg/m³ in a mould in which process the following steps are conducted:

1. an external mould release agent is applied onto at least those surfaces of the mould which will be in contact with the ingredients used for preparing the foam and/or the finished foam;
2. the ingredients to be used for preparing the foam are fed into the mould;
3. the ingredients are allowed to react and to form the polyurethane foam which reaction comprises reacting a polyisocyanate and an isocyanate-reactive composition in the presence of water, wherein the reaction is conducted at an isocyanate index of 40 to 120, the polyisocyanate consists of a) 80–100% by weight of diphenylmethane diisocyanate comprising at least 40%, preferably at least 60% and most preferably at least 85% by weight of 4,4'-diphenylmethane diisocyanate and/or a derivative of said diphenylmethane diisocyanate which derivative is liquid at 25° C. and has an NCO value of at least 10% by weight (polyisocyanate a), and b) 20–0% by weight of another polyisocyanate (polyisocyanate b), and wherein the isocyanate-reactive composition consists of a) 80–100% by weight of a polyether polyol having an average nominal functionality of 2–8, an average equivalent weight of 750–5000, an average molecular weight of 2000–12000, an oxyethylene (EO) content of 60–90% by weight and a primary hydroxyl content of 70–100% calculated on the number of primary and secondary hydroxyl groups in the polyol, and b) 20–0% by weight of one or more other isocyanate-reactive compounds not being water.
4. the polyurethane foam so formed is removed from the mould and
5. steps 2,3 and 4 are repeated at least 10 times without repeating step 1.

The foams obtained have comparable physical properties irrespective of whether the foam is obtained after steps 2,3 and 4 have been conducted once, 10 times, 25 times, 40 times or even more.

The moulding process may be conducted in an open mould and in a closed mould; preferably the reaction takes place in a closed mould. When the moulding process is conducted in a closed mould, the mould may be closed after step 2, and opened after step 3 or the mould may be closed after step 1 and opened after step 3; in the latter case the ingredients for making the foam are fed into the mould via appropriate inlets. The moulding may be conducted by processes known in the art like cast moulding and reaction injection moulding (RIM). As said, step 2–4 are repeated at least 10 times without repeating step 1; preferably this is at least 15 times and most preferably at least 25 times. Although, it would be desirable that steps 2–4 could be repeated as many times as possible without repeating step 1, practice has shown that it may be desirable to repeat step 1, after steps 2–4 have been repeated a considerable number of times without repeating step 1. In general it can be said that step 1 is to be repeated when a substantial increase of the force needed to remove a moulded part is observed, compared to the force needed to remove the first moulded part, to such an extent that it is to be expected that the next demoulding can not be made without damaging the part. Those involved in demoulding on commercial production lines will be able to determine easily if and when step 1 is to be repeated. Although not yet needed because of deteriorating demoulding performance, it might nevertheless be desirable to repeat step 1 after a certain time period, in order to have a consistent production process. In that context it might be desirable to repeat step 1 between two shifts (of e.g. 8 hours), after 24 hours or after a week depending on the complexity of the mould. It is to be noted that a usual cycle time generally is between 0.5 and 20 minutes and often between 1 and 10 minutes.

The process may be conducted in any type of mould known in the art. Examples of such moulds are the moulds commercially used for making polyurethane car seats. The material of the mould may be selected form those known in the art like metal, e.g. steel, aluminium, and epoxy resin.

Step 1 of the process according to the invention may be conducted in any way known in the art. Applying an external mould release agent on the surfaces of a mould, which surfaces will be in contact with the ingredients used for making the material and/or with the material includes any way of applying such an agent to the surfaces, like rubbing, brushing, spraying and combinations thereof and applying any agent or agents intended to facilitate the later demoulding. One or more external mould release agents may be used as well as mixtures of external release agents. The external mould release agents may be applied as such or as a solution, emulsion or dispersion in a liquid. The external mould release agents, applied in step 1, may be applied in one or more stages. Any external mould release agent known in the art may be applied; examples of suitable external mould release agents are Kluberpur 41-0039 and 41-0061 (both from Kluber Chemie), Desmotrol D-10RT from Productos Concentrol SA, Acmosil 180 STBH from Fuller and Johnson Cire 103 from Johnson and Johnson.

EXAMPLES

The following examples are provided to illustrate the invention and should not be construed as limiting thereof.

Examples 1–2

The polyisocyanates mentioned in below table were premixed. The other ingredients were premixed as well. These two mixtures were combined and mixed at 5000 rpm for 3–4 seconds and subsequently poured in an aluminium mould; then the mould was closed. After 6 minutes the parts prepared were demoulded, crushed, left at ambient conditions for a day and subjected to physical testing. During the process the mould was kept at a temperature of 45° C. Before use the mould was treated with Johnson Cire 103 (ex Johnson and Johnson) as external mould release agent. In example 1, the mould used had a content of 9 liters and was loaded with 391 grams of material. In example 2, the mould used had a content of 6.3 liters and was loaded with 326 grams of material. Both moulds have been used to prepare flexible polyurethane foams from similar systems at least 25 times without any treatment of the moulds. The physical properties have been measured according to the methods given before. The amounts in parts by weight of the ingredients used and the physical properties of the obtained flexible polyurethane foams are given in the following Table:

| Example | 1 | 2 |
| --- | --- | --- |
| Polyisocyanate 1 | 74.8 | — |
| Polyisocyanate 2 | 3.9 | — |
| Polyisocyanate 3 | — | 21.7 |
| Polyisocyanate 4 | — | 14.5 |

-continued

| Example | 1 | 2 |
|---|---|---|
| CARADOL SA 36-02 polyol | 18.8 | 61.2 |
| NIAX A1 catalyst | 0.1 | 0.08 |
| DABCO 33 LV catalyst | 0.3 | 0.35 |
| water | 2.11 | 2.13 |
| NCO index | 95 | 95 |
| Apparent overall density, kg/m$^3$ | 49.4 | 41.7 |
| Resilience, % | 60 | 56 |
| Compression load deflection (CLD 40) | 6.1 | 5.4 |
| Creep, % | 2.8 | — |
| Compression set (dry, 50%), % | 3.8 | 3.5 |
| (humid, 50%), % | 0 | 0 |

Polyisocyanate 1 is the reaction product of an excess of 4,4'-MDI and a polyoxyethylene polyoxypropylene polyol having a molecular weight of 4000, an oxyethylene content of about 75% by weight (all random), a nominal functionality of 3, a primary hydroxyl content of about 45% and an unsaturation below 0.01 meq/g, the NCO value of the reaction product being 12% by weight (reaction was conducted in the presence of 10 ppm thionylchloride).

Polyisocyanate 2 is a mixture of about 52 parts by weight of Suprasec 2020 and about 48 parts by weight of the reaction product of 42.9 parts by weight of 4,4'-MDI and 5.1 parts by weight of tripropylene glycol.

Polyisocyanate 3 is SUPRASEC 2020 isocyanate (Huntsman Polyurethanes), a uretonimine modified, 4,4'-MDI having an NCO value of about 29.5% by weight.

Polyisocyanate 4 is Suprasec MPR isocyanate (Huntsman Polyurethanes), a polyisocyanate comprising about 98% by weight of 4,4'-MDI the remainder being primarily 2,4'-MDI.

Caradol SA 36–02 polyol (Shell) is a polyoxyethylene polyoxypropylene polyol having a nominal functionality of 3, a molecular weight of about 4500, an OH value of about 37 mg KOH/g, an oxyethylene content of about 77% by weight and a primary hydroxyl content of about 91%.

DABCO 33LV catalyst is a catalyst from Air Products.

NIAX A1 catalyst is a catalyst from Osi.

Examples 3–4

Free rise foams were made in a 10 l bucket using the following ingredients, and the foams had the following properties:

| Example | 3 | 4 |
|---|---|---|
| Polyisocyanate 3 + Polyisocyanate 4 (30/70 w/w) | 47 | 47 |
| Polyol 1 | 100 | 100 |
| Polyol 2 | 5 | 0 |

-continued

| Example | 3 | 4 |
|---|---|---|
| Dabco 33LV | 0.5 | 0.5 |
| water | 2.5 | 2.5 |
| free rise density, kg/m$^3$ | 49 | 61 |
| Resilience, % | 47 | 64 |

The foams had open cells and could be crushed easily.

Polyol 1 is a sorbitol initiated, polyoxyethylene polyoxypropylene polyol having an OH value of 39 mg KOH/g, an EO content of about 75% by weight and a primary hydroxyl content of 91%.

Polyol 2 is a sorbitol initiated, polyoxyethylene polyol having an OH value of 187 mg KOH/g.

Examples 5–6

Example 3 was repeated with polyols 3 and 4. The results are as follows:

| Example | 5 | 6 |
|---|---|---|
| Polyol 3 | 100 | — |
| Polyol 4 | — | 100 |
| Polyol 2 | 5 | 5 |
| DABCO 33 LV catalyst | 0.5 | 0.5 |
| Polyisocyanate 3 + 4 | 47 | 45 |
| Water | 2.5 | 2.5 |
| Index | 108 | 100 |
| Free rise density, kg/m$^3$ | 39 | 42 |
| Hysteresis loss | 18 | 13.5 |
| Resilience | 64 | 63 |

| Characteristic | polyol 3 | polyol 4 |
|---|---|---|
| OH value, mg KOH/g | 20 | 26 |
| Nominal functionality | 3 | 3 |
| Molecular weight | 8400 | 6500 |
| Equivalent weight | 2800 | 2165 |
| Unsaturation, meq/g | 0.006 | 0.004 |
| EO content, % by weight | 76 | 76 |
| primary OH content | 95 | 92 |

Examples 7–10

Free rise foams were made in a 10 l bucket using the following ingredients (in parts by weight):

| Example | 7 | 8 | 9 | 10 |
|---|---|---|---|---|
| Polyisocyanate 3 + Polyisocyanate 4 (40/60 w/w) | 47 | 47 | 47 | 47 |
| Caradol SA 36-02 | 100 | 80 | 80 | 80 |
| Polyol 5 | — | 20 | 20 | 20 |
| Polyol 6 | — | — | 0.5 | 1 |
| Dabco 33 LV | 0.7 | 0.5 | 0.5 | 0.5 |
| Water | 2.5 | 2.5 | 2.5 | 2.5 |
| Open/close* | 1 | 1–2 | 1–2 | 2 |
| Shrinkage | No | No | No | No |

*on a 1–5 scale; 1 = open and 5 = closed

Polyol 5 is a glycerol-initiated polyoxyethylene polyoxypropylene polyol having an oxyethylene content of about 29% by weight, an equivalent weight of about 2000 and having first a PO block, then a random EO/PO block and at the tip and EO block (15% w).

Polyol 6 is a glycerol initiated polyoxyethylene polyoxypropylene polyol having 15% by weight of EO (all tip) and an equivalent weight of about 2000.

What is claimed is:

1. A process for preparing a flexible polyurethane foam having an apparent overall density of 15–150 kg/m$^3$ comprising reacting in a mould a polyisocyanate and an isocyanate-reactive composition in the presence of water, wherein the reaction is conducted at an isocyanate index of 40 to 120, the polyisocyanate comprising:
    a) 80–100% by weight of a diphenylmethane diisocyanate comprising at least 40% by weight of 4,4'-diphenylmethane diisocyanate and/or a variant of said diphenylmethane diisocyanate which variant is liquid at 25° C. and has an NCO value of at least 5% by weight, and
    b) 20–0% by weight of another polyisocyanate, and the isocyanate-reactive composition comprising:
    a) 70–100% by weight of a polyether polyol having an average nominal functionality of 2–8, an average equivalent weight of 750–5000, an average molecular weight of 2000–12000, an oxyethylene content of 60–90% by weight and a primary hydroxyl content of 70–100% calculated on the number of primary and secondary hydroxyl groups in the polyol, and
    b) 30–0% by weight of one or more other isocyanate-reactive compounds not being water.

2. The process of claim 1, wherein the density of the flexible polyurethane foam is 25–50 kg/m$^3$.

3. The process of claim 1, wherein the amount of water is 0.8–5% by weight calculated on all other ingredients used.

4. The process of claim 2, wherein the amount of water is 0.8–5% by weight calculated on all other ingredients used.

5. The process of claim 1, wherein the reaction is conducted at an isocyanate index of 70–110.

6. The process of claim 2, wherein the reaction is conducted at an isocyanate index of 70–110.

7. The process of claim 3, wherein the reaction is conducted at an isocyanate index of 70–110.

8. The process of claim 4, wherein the reaction is conducted at an isocyanate index of 70–110.

9. The process of claim 1, wherein the oxyethylene content is 65–85% by weight, the average nominal functionality is 2–6, the average equivalent weight is 1000–4000 and the average molecular weight is 2000–10000 and the diphenylmethane diisocyanate comprises at least 85% by weight of 4,4'-diphenylmethane diisocyanate and/or a variant thereof.

10. The process of claim 1, wherein the resilience of the foam is 40–80%.

11. The process of claim 1, wherein 1 the resilience of the foam is 50–80%.

12. The process of claim 1, wherein the variant has an NCO value of at least 20% by weight.

13. The process of claim 1, wherein the process is conducted with restricted foam rise.

14. The process of claim 1, wherein 1 the foam is allowed to rise in a closed mould.

15. The process of claim 1, wherein an external mould release agent is applied onto at least those surfaces of the mould which will be in contact with the ingredients used for preparing the foam and/or the finished foam.

16. The process of claim 1, wherein the process is conducted in a metal or epoxy resin mould.

17. A moulded flexible polyurethane foam having an apparent overall density of 25–50 kg/m$^3$, an oxyethylene content of 35–60% by weight based on the weight of the foam, and a resilience of 50–80% and comprising oxyethylene and oxypropylene groups in a ratio of 1.5:1–9:1 w/w.

18. The moulded flexible polyurethane foam of claim 17, wherein the foam has a load bearing capacity (CLD 40) of 1–15 kPa.

19. The moulded flexible polyurethane foam of claim 17, wherein the foam has been prepared in a closed mould.

* * * * *